(12) United States Patent
Ishii

(10) Patent No.: US 8,444,231 B2
(45) Date of Patent: May 21, 2013

(54) DISK BRAKE APPARATUS

(75) Inventor: Hideaki Ishii, Minami-ALPS (JP)

(73) Assignee: Hitachi, Ltd., Tokyo (JP)

( * ) Notice: Subject to any disclaimer, the term of this patent is extended or adjusted under 35 U.S.C. 154(b) by 1108 days.

(21) Appl. No.: 12/222,633

(22) Filed: Aug. 13, 2008

(65) Prior Publication Data

US 2009/0057073 A1    Mar. 5, 2009

(30) Foreign Application Priority Data

Aug. 31, 2007    (JP) ................................ 2007-227177

(51) Int. Cl.
     *F16D 65/14*      (2006.01)
(52) U.S. Cl.
     USPC ................. 303/191; 303/155; 188/1.11 E
(58) Field of Classification Search .................... 303/20, 303/155, 191; 188/1.11 E
See application file for complete search history.

(56) References Cited

U.S. PATENT DOCUMENTS

| | | | |
|---|---|---|---|
| 6,367,889 | B1 | 4/2002 | Tsubouchi et al. |
| 6,464,308 | B2 * | 10/2002 | Kubota ........................... 303/20 |
| 7,140,697 | B2 * | 11/2006 | Koga et al. ...................... 303/20 |
| 7,481,500 | B2 * | 1/2009 | Miyazaki et al. ........... 303/122.1 |
| 2003/0125863 | A1 | 7/2003 | Tamasho et al. |
| 2005/0029858 | A1 | 2/2005 | Forster et al. |
| 2007/0176489 | A1 * | 8/2007 | Matsuura et al. ............. 303/155 |
| 2009/0184573 | A1 * | 7/2009 | Nakajima ..................... 303/155 |

FOREIGN PATENT DOCUMENTS

| | | |
|---|---|---|
| DE | 195 21 401 | 1/1997 |
| JP | 2000-46082 | 2/2000 |
| JP | 2001-32868 | 2/2001 |
| JP | 2001-88668 | 4/2001 |
| JP | 2002-213507 | 7/2002 |
| JP | 2003-276587 | 10/2003 |
| JP | 2006-307994 | 11/2006 |
| WO | 96/41969 | 12/1996 |
| WO | 2006/085047 | 8/2006 |

OTHER PUBLICATIONS

European Search Report (in English language) issued Jan. 15, 2009 in European Patent Application No. 08015112.9.

Japanese Office Action (with partial English translation) issued Aug. 22, 2012 in corresponding Japanese Patent Application No. 2008-185006, which was derived from Japanese Patent Application No. 2007-227177.

* cited by examiner

*Primary Examiner* — Bradley King
(74) *Attorney, Agent, or Firm* — Wenderoth, Lind & Ponack, L.L.P.

(57) ABSTRACT

A disk brake apparatus in which a determination is made as to whether a centering operation should be performed, and operation conditions for the centering operation (the length of the interval and the number of the operations) are set, according to a change of deformation of a disk rotor by heat release over time. When the centering operation is performed, a solenoid is actuated to perform the centering operation according to the set operation conditions. The centering operation is an operation of moving a pair of brake pads (2) and (3) into contact with the disk rotor (1) and then separating the pads from the disk rotor during a cooling process while a vehicle is running.

20 Claims, 14 Drawing Sheets

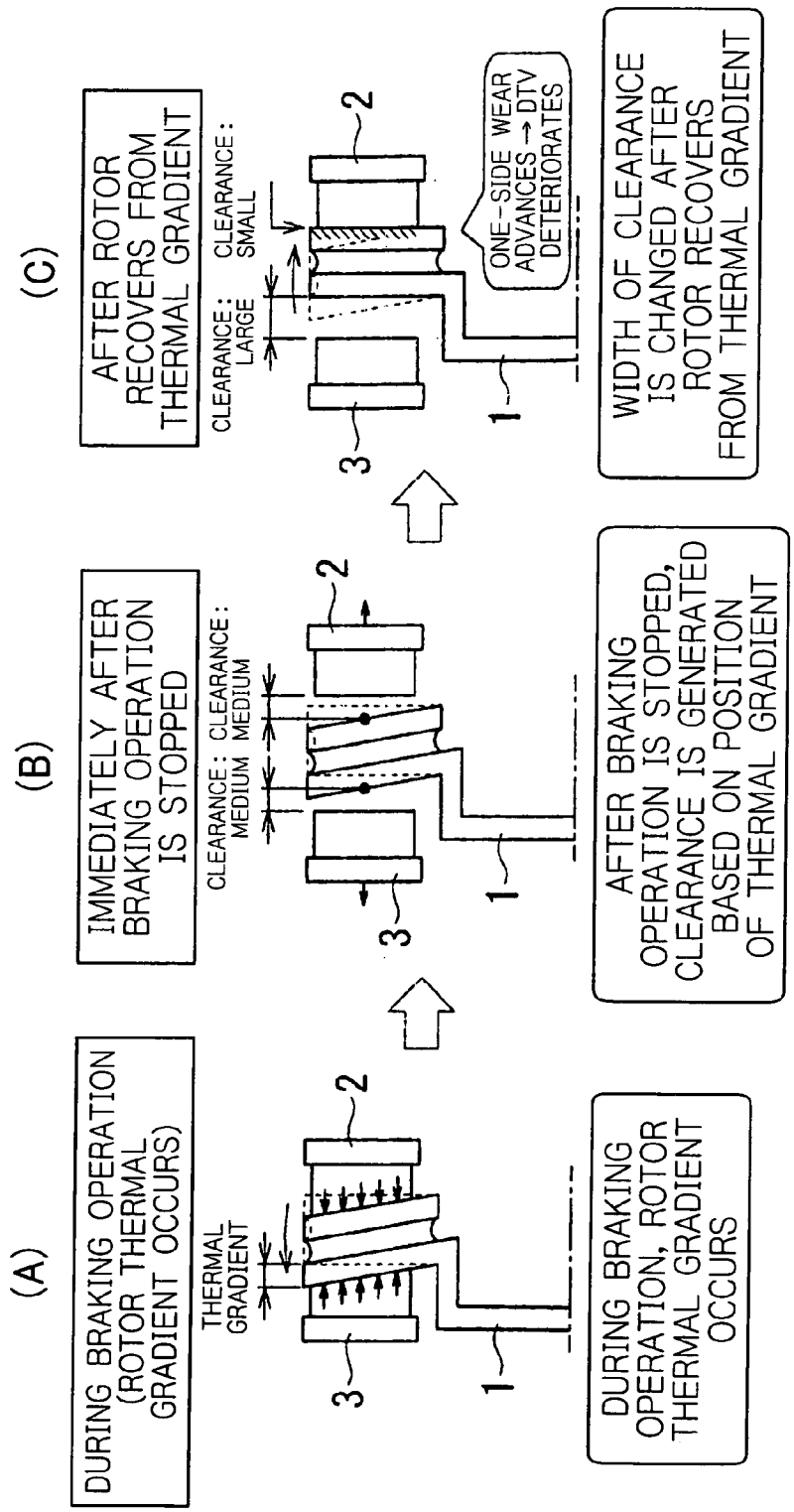

DISK BRAKE APPARATUS

BACKGROUND OF THE INVENTION

The present invention relates to a disk brake apparatus for use in braking of a vehicle.

FIG. 14 shows states of clearances between brake pads and a disk rotor of a disk brake apparatus used in a vehicle of a first related art of the present invention. As shown in FIG. 14, during braking, the temperature of the disk rotor 1 used in the disk brake apparatus of the first related art increases due to contact of the disk rotor 1 with the brake pads 2 and 3 [hereinafter the right pad in FIG. 14(A) is also referred to as "inner pad 2", and the left pad in FIG. 14(A) is also referred to as "outer pad 3"], and tilting of a braking surface, i.e., thermal gradient may occur [FIG. 14(A)], although the braking surface is perpendicular to an axis of the disk at normal temperature. In this case, upon stop of the braking operation, clearances are generated based on the position of the thermal gradient [FIG. 14(B)]. After a certain time has passed, the disk rotor 1 returns to the normal state or recovers from the thermal gradient [FIG. 14(C)]. Immediately after the braking operation is stopped [FIG. 13(B)], the clearance between the disk rotor 1 and the inner pad 2 is substantially equal to that between the disk rotor 1 and the outer pad 3. However, when the disk rotor 1 recovers from the thermal gradient [FIG. 14(C)], the clearances are different [see the solid line in FIG. 14(C)]. If the vehicle continues to run with the brake rotor 1 that has recovered from the thermal gradient in this way, so-called one-side wear may occur, leading to generation of disk thickness variation (DTV) of the disk rotor 1. The thickness variation may cause occurrence of judder (Brake Judder; hereinafter referred to as "judder").

As disk brake apparatuses aiming to solve this problem, for example, there are known disk brake apparatuses disclosed in Japanese Patent Application Public Disclosure No. 2006-307994 (hereinafter referred to as "patent document 1"), and Japanese Patent Application Public Disclosure No. 2000-46082 (hereinafter referred to as "patent document 2"). In the disk brake apparatus disclosed in patent document 1, the clearance is adjusted so that the clearance is expanded to satisfy the equation (clearance)>(axial displacement distance+surface run-out).

As mentioned above, in the disk brake apparatus disclosed in patent document 1, the problem caused by the thermal gradient of the rotor is solved by expanding the clearance. However, the expansion of the clearance in the apparatus of patent document 1 causes various negative effects (nega) such as impaired responsiveness, deteriorated pedal feeling, rattle generation, and decreased cleanablility. Due to the presence of these negative effects, it is sometimes undesirable or impossible to employ the apparatus of patent document 1 under present circumstances.

In the disk brake apparatus disclosed in patent document 2, it is possible to prevent negative effects, which would otherwise be caused by expanding the clearance as mentioned above, by performing a clearance minimizing control. However, the disk brake apparatus disclosed in patent document 2 still has a drawback; that is, although it is possible to prevent negative effects which would otherwise be caused by expanding the clearance, a self-cleaning operation is regularly performed in this apparatus, whereby a change of temperature of a rotor is induced, which leads to an increase in thermal gradient, causing an adverse effect.

SUMMARY OF THE INVENTION

The present invention has been contrived in consideration of the above-described circumstances, and an object thereof is to provide a disk brake apparatus in which the problem associated with thermal gradient, and therefore judder occurrence can be effectively prevented.

The present invention is provide a disk brake apparatus, wherein: a brake pad is moved by actuating an actuator so that the brake pad is pressed against a disk rotor to generate a braking force; and the disk brake apparatus comprises a controller adapted to control the actuator to cause the brake pad to be moved into contact with the disk rotor, and then be separated from the disk rotor so that a pad clearance is adjusted according to a change of deformation of the disk rotor by heat release over time after the braking force is generated.

BRIEF DESCRIPTION OF THE DRAWINGS

FIG. 14 illustrates states of clearances between brake pads and a disk rotor of a disk brake apparatus, and FIG. 14(A), 14(B) and 14(C) respectively illustrate states of the clearances during a braking operation, immediately after the braking operation is stopped, and after the rotor has recovered from thermal gradient.

DETAILED DESCRIPTION OF THE PREFERRED EMBODIMENT (First Embodiment)

Hereinafter, a disk brake apparatus of a first embodiment of the present invention will be described with reference to FIGS. 1 to 3.

Figure 1:
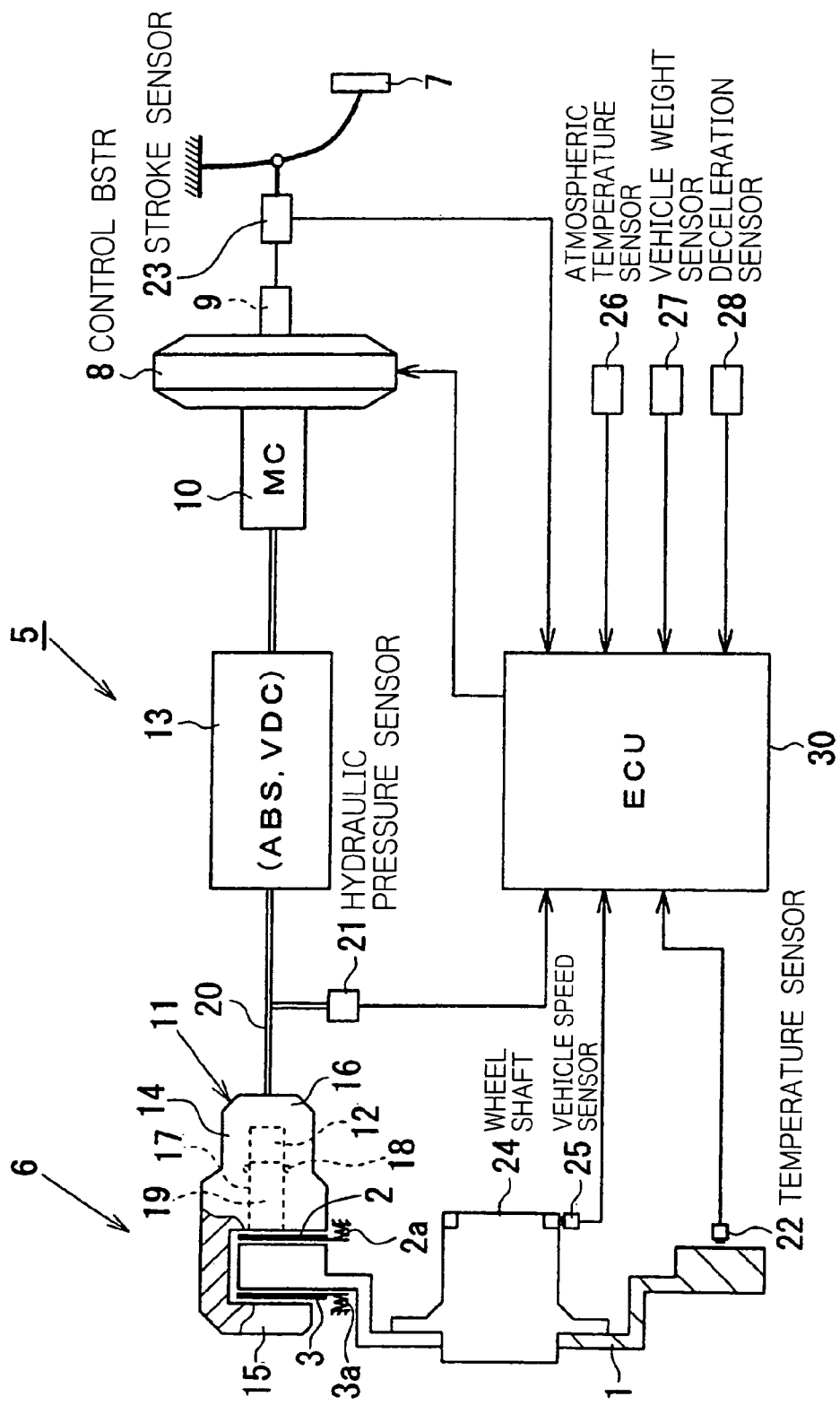
FIG. 1 schematically illustrates a disk brake apparatus of a first embodiment of the present invention.

As shown in FIG. 1, a disk brake apparatus 5 generally comprises a floating caliper type disk brake 6, an ACC control booster (Adaptive Cruise Control control booster) 8, a master cylinder (hereinafter referred to as "MC") 10, and an automatic brake system 13. The ACC control booster 8 is adapted to amplify a force of pressing of a brake pedal 7 and output the amplified force, or is adapted to generate an output using a solenoid 9 (actuator), independently of the force of pressing of the brake pedal 7. The MC 10 is adapted to generate a hydraulic pressure according to the amplified output of the force of pressing of the brake pedal 7, or by the output that the ACC control booster 8 generates using the solenoid 9 (actuator). An ABS (Anti-lock Brake System) and a VDC (Vehicle Dynamics Control System) are incorporated in the automatic brake system 13 which is disposed between the MC 10 and a hydraulic pressure chamber 12 of a caliper 11 of the disk brake 6.

The disk brake 6 comprises a pair of brake pads 2 and 3 (hereinafter the right and left brake pads in FIG. 1 are also referred to as "inner pad 2" and "outer pad 3", respectively) disposed on the respective sides of a disk rotor 1 (hereinafter also referred to as "rotor") attached to a wheel shaft 24, and the caliper 11 adapted to generate a braking force by pressing the pair of brake pads 2 and 3 against the respective surfaces of the disk rotor 1. The caliper 11 generally comprises a cylinder portion 14 facing the inner pad 2, and a claw portion 15 extending from the cylinder portion 14 to the opposite side of the disk rotor 1 so as to straddle the disk rotor 1. A pair of return springs 2a and 3a are disposed at the pair of brake pads 2 and 3 for biasing the brake pads 2 and 3 away from the disk rotor 1. Due to the provision of the pair of return springs 2a and 3a, a pad clearance is generated between the disk rotor 1, and each of the brake pads 2 and 3.

A bottomed cylinder 17 is formed at the cylinder portion 14 so as to have an open end on the inner pad 2 side and the other end closed by a bottom wall (cylinder bottom wall) 16. A piston 19 is slidably disposed in the cylinder 17 via a piston seal 18. The piston 19 is restrained from rotating relative to the cylinder 17. The hydraulic pressure chamber 12 is defined between the piston 19 and the cylinder bottom wall 16. The MC 10 is connected to the hydraulic pressure chamber 12 via the automatic brake system 13, whereby a hydraulic pressure from the MC 10 is supplied to the hydraulic pressure chamber 12 after it is controlled by the ABS and VDC systems of the automatic brake system 13.

A hydraulic pressure sensor 21 is disposed at a branch diverging from a brake liquid passage 20 connecting the hydraulic pressure chamber 12 and the automatic brake system 13. A temperature sensor (temperature measuring unit) 22 is disposed adjacent the disk rotor 1 for measuring a temperature of the disk rotor 1. A stroke sensor 23 is disposed for detecting an operation amount (stroke) of the brake pedal 7 from an operation of the brake pedal 7. A vehicle speed sensor 25 is disposed for detecting a vehicle speed from an operation of the wheel shaft 24. An atmospheric temperature sensor 26, a vehicle weight sensor 27 and a deceleration sensor 28 are disposed at a vehicle where the disk brake apparatus 5 is mounted for measuring an atmospheric temperature, a vehicle weight and deceleration, respectively.

An ECU (electronic control unit or controller) 30 is connected to the hydraulic pressure sensor 21, the temperature sensor 22, the stroke sensor 23, the vehicle speed sensor 25, the atmospheric temperature sensor 26, the vehicle weight sensor 27 and the deceleration sensor 28. The ECU 30 is adapted to perform a control for generating a desired braking force by controlling the solenoid 9 of the ACC control booster 8 based on detection signals from the various sensors, while generating a desired clearance by performing a control for adjusting a clearance (clearance adjusting control) which includes a centering operation for preventing judder occurrence as will be described later.

The clearance adjusting control performed by the ECU 30 will be described with reference to a flow chart of FIG. 2 and FIG. 3(A).

The ECU 30 starts a brake control based on a detection signal outputted from the stroke sensor 23 in response to an operation of the brake pedal 7 [step S1, "BRAKING START" in FIG. 3(A)], then a braking operation is performed. The braking operation is continued while depression of the brake pedal 7 is continued [while the result of the determination as to whether the brake control is finished (step S2 or a step following step S1) is NO]. If the result of the determination at S2 is YES ("BRAKING STOP" in FIG. 3(A)), then the brake control is stopped, and the flow proceeds to step S3. One operation performed from "BRAKING START" until "BRAKING STOP" in FIG. 3(A) is counted as a single braking operation. When the braking operation is performed, thermal deformation (thermal gradient) of the disk rotor 1 occurs. When the braking operation is stopped, the temperature of the disk rotor 1 is reduced by heat release. When braking is not performed for a certain time period after that, the disk rotor 1 returns to the normal state or recovers from the thermal deformation (thermal gradient). Until the disk rotor 1 recovers from the thermal deformation (thermal gradient) since the braking operation is stopped, that is, during a cooling process while the vehicle is running, the centering operation ["CENTERING" in FIG. 3(A)] is performed, as will be described later.

At step S3, it is determined whether a value detected by the temperature sensor 22, i.e., a temperature of the disk rotor 1, is equal to or more than a predetermined value (i.e., whether an amount of the deformation of the disk rotor 1 is equal to or more than a predetermined amount), whereby it is determined whether a control for preventing generation of thickness variation of the disk rotor 1 to prevent judder occurrence (clearance adjusting control) should be performed. If the result of the determination at step S3 is NO, the clearance adjusting control is ended.

At step S3, it is determined based on a value detected by the temperature sensor 22 (i.e., a temperature of the disk rotor 1) whether an amount of the deformation of the disk rotor 1 is equal to or more than a predetermined amount. In the first embodiment, a thermal deformation estimating unit is embodied by step S3 (ECU 30).

If the result of the determination at S3 is YES, then operation conditions (the length of interval between the centering operations, and the number of the centering operations to be performed) required for performing the clearance adjusting control are set based on, for example, a detection value of the temperature sensor 22 (step S4). The centering operation is an operation of actuating the caliper 11, more specifically, an operation of causing caliper 11 to hold the disk rotor 1 for a quick moment by utilizing a hydraulic pressure in the MC 10 generated by an output generated in the ACC control booster 8 by quickly turning on/off the solenoid 9, i.e., causing the caliper 11 to close the clearance to such an extent that heat is not generated (by causing the brake pads 2 and 3 to move toward or contact the disk rotor 1), and then to release the disk rotor 1 immediately. The interval between the centering operations means a time period to be elapsed between the centering operations (including a time period between the braking stop event and the first centering operation event).

In the first embodiment, as shown in FIG. 3(A), the centering operation is performed six times. The interval between the first and second centering operations is longer than the interval between the braking stop and the first centering operation. The intervals between the second and third centering operations, between the third and fourth centering operations, and between the fourth and fifth centering operations are equal to the interval between the first and second centering operations. The interval between the fifth and sixth centering operations is longer than the interval between the first and second centering operation.

In some embodiments, the lengths of all intervals may be the same. In other embodiments, the length of the interval may be gradually increased with each centering operation.

In the first embodiment, the centering operation is performed six times. In some embodiments, the centering operation may be performed twice, ... five times, seven times, or more than seven times, instead of six times.

After step S4, it is determined whether the interval set at step S4 has passed (step S5). If the result of the determination at step S5 is NO, the determination of step S5 is repeated. If the result of the determination at step S5 is YES, then it is determined whether the number of the centering operations that have been performed is less than the set value (six times in the first embodiment)(step S6).

If the result of the determination at step 6 is NO (the number of the operations reaches the set value), then the clearance adjusting control is ended.

If the result of the determination at step 6 is YES (the number of the operations is less than the set value), it is determined whether the centering operation (clearance adjusting control) should be performed by determining from a detection result of the vehicle speed sensor 25 whether the vehicle is running (step S7). If the result of the determination at step 7 is NO, i.e., it is determined that the vehicle is not running, then the flow returns to step S5. If the result of the determination at step 7 is YES, then the centering operation is performed by actuating the solenoid at step S8 ["CENTERING" in FIG. 3(A)], and a centering operation counter is incremented by one. Then, the flow returns to step S5, and the centering operation is repeated until the determination result at step S6 becomes NO (the number of the operations reaches the set value). In the first embodiment, one braking operation is performed, and after the braking operation is stopped, the centering operation is performed six times [the first to the sixth centering operations are performed]. Alternatively, at step S7, it may be determined whether the centering operation (clearance adjusting control) should be performed, by estimating that deformation of the disk rotor 1 (recovery of the disk rotor 1 from the thermal gradient by cooling) has occurred if a measuring result of the temperature sensor 22 (temperature measuring unit) indicates a predetermined temperature decrease of the disk rotor 1. In this case, the thermal deformation estimating unit is embodied by step S7 (ECU 30) as well as step S3.

As mentioned above, the determination whether the centering operation should be performed is made (step S3), and the operation conditions of the centering operation (the length of the interval and the number of the operations) are set (step S4), according to a change of deformation of the disk rotor 1 by heat release over time. If it is determined that the centering operation should be performed, the centering operation is performed [the pair of brake pads 2 and 3 is caused to contact the disk rotor 1, and then is separated from the disk rotor 1 during a cooling process while the vehicle is running] under the set operation conditions (set according to the change of deformation of the disk rotor 1 by heat release over time) by actuating the solenoid 9 (step S8). Therefore, it is possible to perform the clearance adjusting control according to the change of thermal deformation of the disk rotor 1 over time, and thereby possible to reduce the contact time of the brake pads with the disk rotor 1 to prevent generation of disk thickness variation (DTV) of the disk rotor 1 to prevent judder occurrence If it is determined at S7 that the vehicle is not running based on the detection result of the vehicle speed sensor 25, step S8 is not performed.

The inventors of the present application compared the state of the clearance after stop of one braking operation in the disk brake apparatus of the first embodiment to those in disk brake apparatuses of related arts. As disk brake apparatuses of related arts, the before-mentioned disk brake apparatus of the first related art, the disk brake apparatus disclosed in patent document 1 (the disk brake apparatus having a large clearance), and the disk brake apparatus disclosed in patent document 2 (the disk brake apparatus having a minimized clearance for preventing the negative effects caused by clearance expansion) were used. The resulted states of the clearances in the disk brake apparatuses of the first embodiment, the first related art, patent document 1, and patent document 2 are respectively shown by the solid line in FIG. 3(A), the solid line in FIG. 3(B), the alternate long and two short dashes line in FIG. 3(B), and the dotted line in FIG. 3(B). The mark "x" in FIG. 3 indicates that the brake pads 2 and 3 contact the disk rotor 1.

By comparing them, the following facts were confirmed.

In the disk brake apparatuses shown by the solid line and the dotted line in FIG. 3(B), i.e., the disk brake apparatuses other than that of patent document 1 (shown by the alternate long and two short dashes line, the apparatus having a large clearance), the brake pads 2 and 3 contact the disk rotor 1 for a long time, and therefore it is highly likely that thickness variation could be generated by contact of the brake pads 2 and 3 with the disk rotor 1, possibly resulting in judder occurrence.

On the contrary, in the disk brake apparatus of the first embodiment shown in FIG. 3(A), the time of contact of the brake pads 2 and 3 with the disk rotor 1 is short, and therefor it becomes possible to prevent disk thickness variation (DTV) of the disk rotor 1 which otherwise might be generated by contact of the brake pads 2 and 3 with the disk rotor 1, and accordingly, it becomes possible to prevent judder occurrence.

(Second Embodiment)

In the first embodiment, it is determined at step S3 whether the centering operation (clearance adjusting control) should be performed, based on the detection value of the temperature sensor 22. However, the temperature sensor 22 may be replaced with pad displacement sensors 31a and 31b or a rotor displacement sensor 31c operable to detect displacement of the disk rotor 1 (see FIG. 4, thermal deformation measuring unit), and it may be determined whether the centering operation (clearance adjusting control) should be performed based on an amount of deformation of the disk rotor 1 obtained from a detection signal of the pad displacement sensors 31a and 31b or the rotor displacement sensor 31c.

Figure 2:
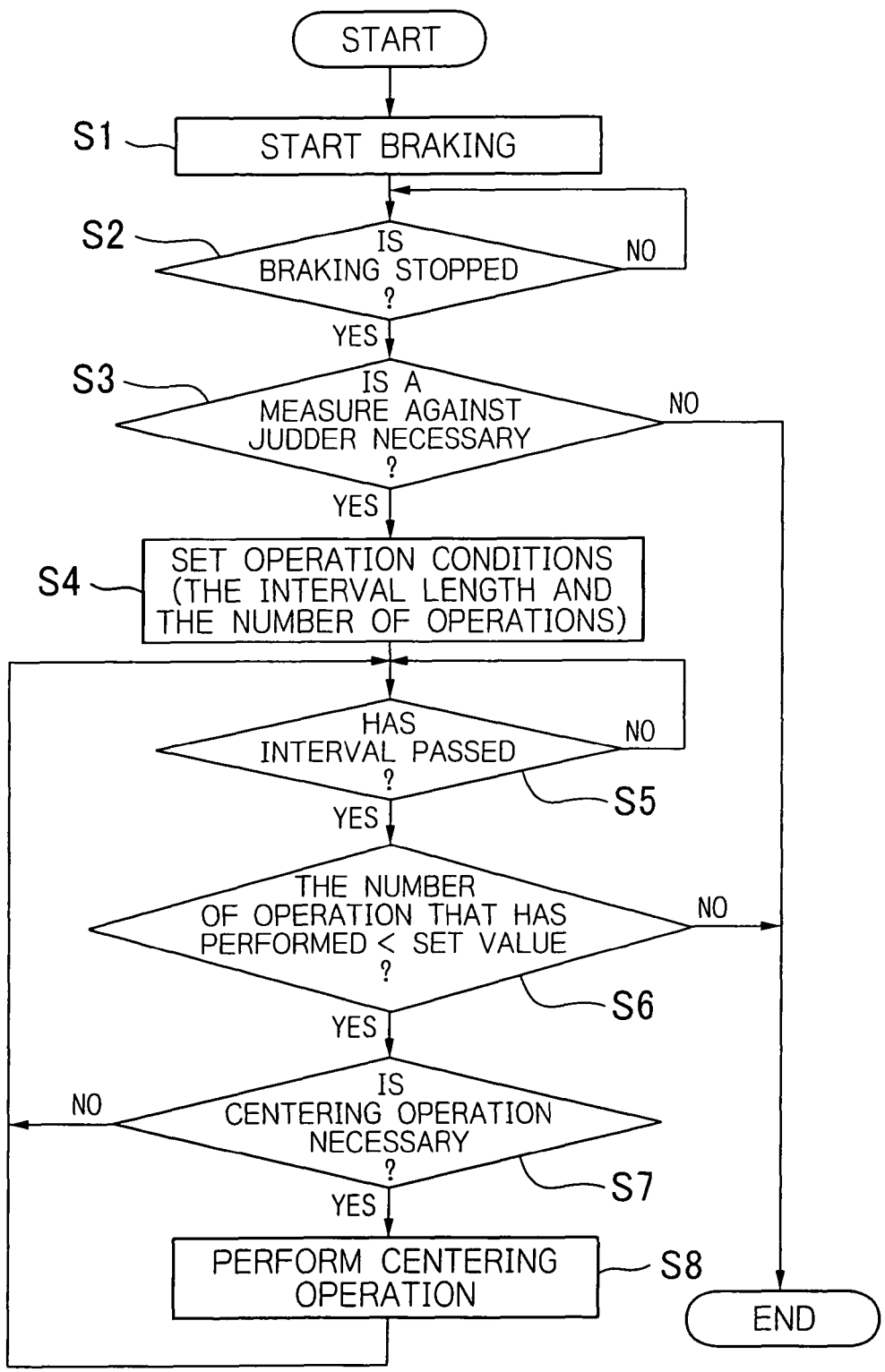
FIG. 2 is a flow chart illustrating a control performed by an ECU of the disk brake apparatus shown in FIG. 1.
Figure 3:
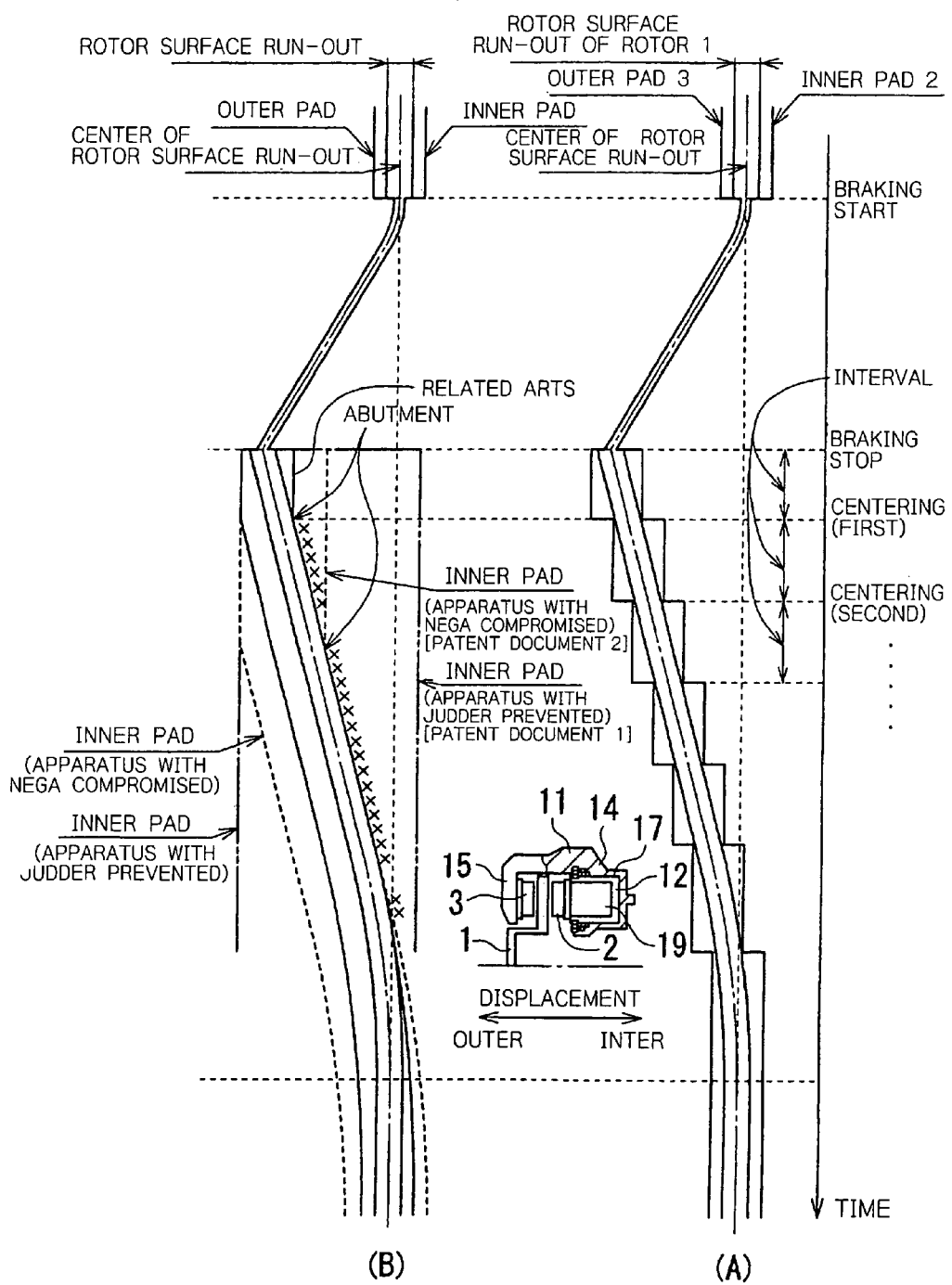
FIG. 3 illustrates comparison between an operation of the disk brake apparatus shown in FIG. 1 and operations of disk brake apparatuses of related arts, and FIG. 3(A) and FIG. 3(B) respectively illustrate an operation result of the disk brake apparatus shown in FIG. 1 and operation results of the disk brake apparatuses of the related arts.
Figure 4:
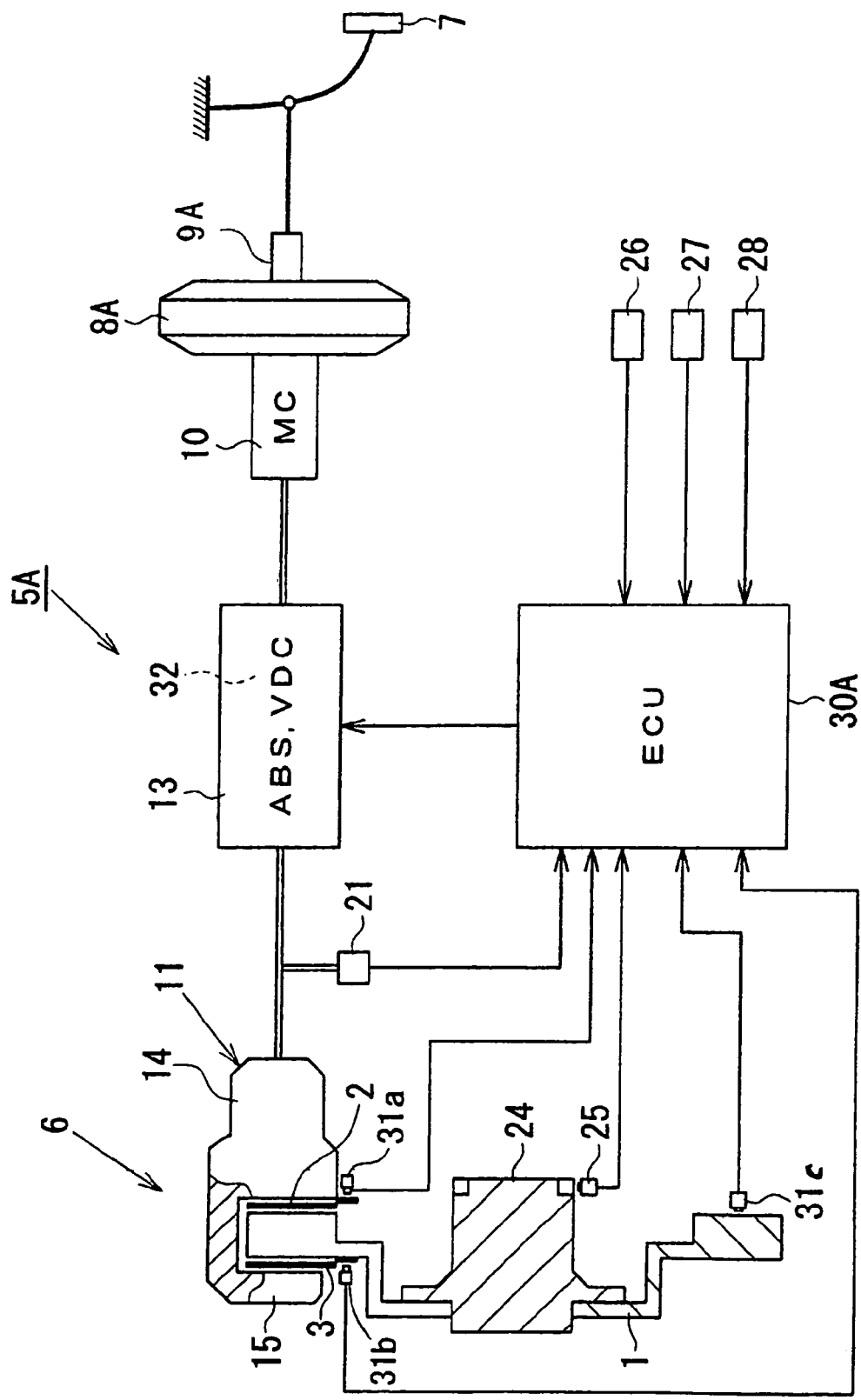
FIG. 4 schematically illustrates a disk brake apparatus of a second embodiment of the present invention.

FIG. 4 schematically illustrates a disk brake apparatus of a second embodiment of the present invention. A disk brake apparatus 5A of the second embodiment will be described referring to FIGS. 4 and 5, also sometimes referring to FIGS. 1 to 3 as necessary. The second embodiment is provided with, instead of the temperature sensor 22, the pad displacement sensors 31a and 31b (see FIG. 4) operable to detect a displacement of pads 2 and 3 from a travel distance of the pads, and the rotor displacement sensor 31c operable to directly detect a displacement of a disk rotor 1.

An ECU 30A (see FIG. 4) of the second embodiment calculates an amount of thermal gradient of the disk rotor 1 based on a detection signal of the rotor displacement sensor 31 [steps S20 and S23], and predetermines a first threshold value for a thermal gradient amount change, and a second threshold value for a change of the thermal gradient amount change, to compare the thermal gradient amount change with the first threshold value (step S24), and the change of the thermal gradient amount change with the second threshold value (step S25).

In the first embodiment, the centering operations are performed with intervals therebetween, while in the second embodiment, the centering operations are performed, monitoring a recovery amount of the thermal gradient of the disk rotor 1.

Figure 5:
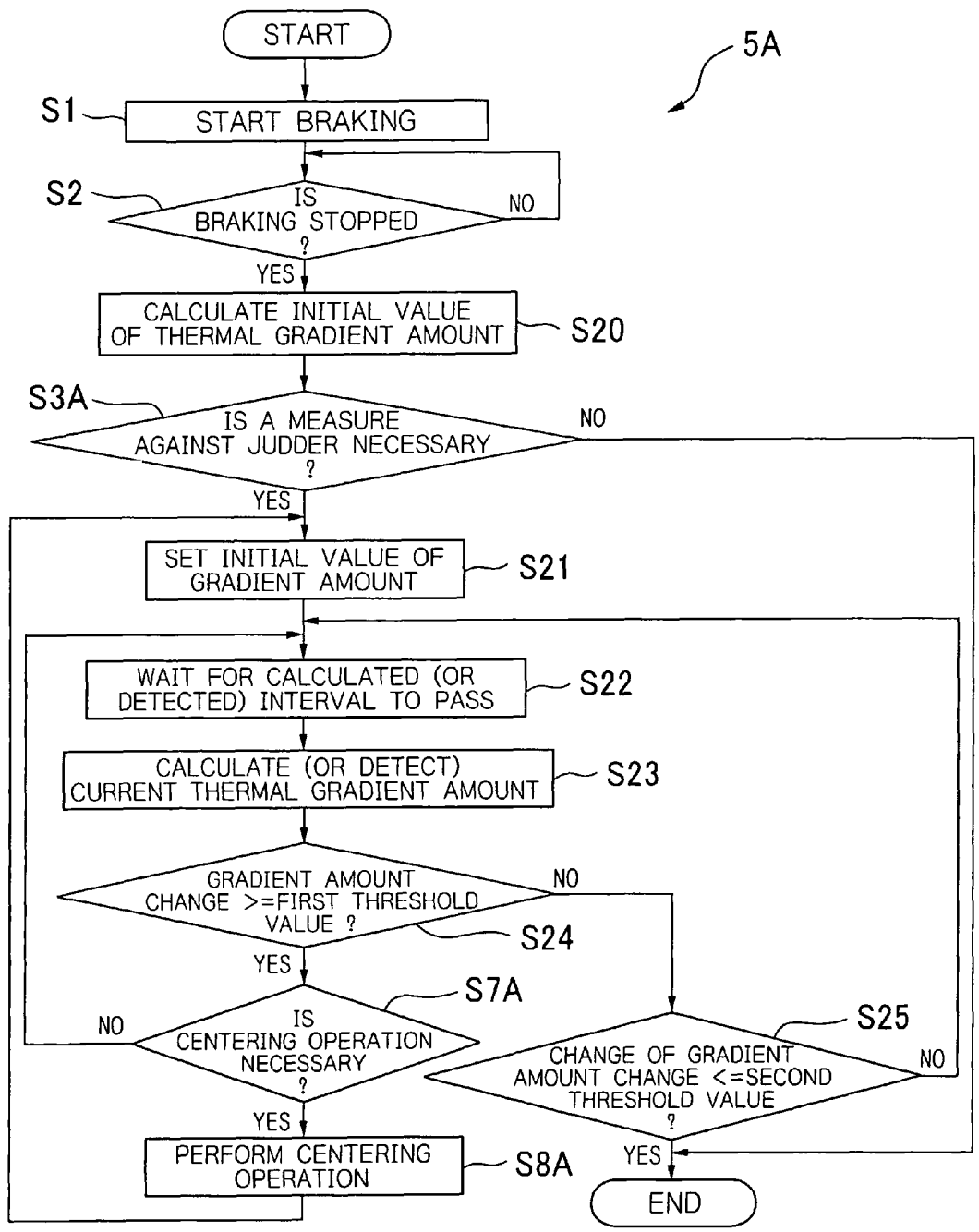
FIG. 5 is a flow chart illustrating a control performed in the disk brake apparatus of the second embodiment of the present invention, in contrast with the flow chart of FIG. 2.

The clearance adjusting control performed by the ECU 30A of the second embodiment is now described with reference to a flow chart of FIG. 5. As shown in FIG. 5, steps S1 and S2 are performed in the same manner as in the first embodiment (FIG. 2). If the result of the determination at step S2 is YES, then the ECU 30A calculates an initial value of the thermal gradient amount based on a detection signal of the pad displacement sensors 31a and 31b or the rotor displacement sensor 31c [step S20].

After step S20, it is determined whether any measure against judder should be taken (step S3A), similarly to step S3 in the first embodiment (FIG. 3). At step 3 in FIG. 2, the determination is made based on the detection value of the temperature sensor 22, while at step S3A, the determination is made based on the initial value of the thermal gradient amount (also referred to as gradient amount) of the disk rotor 1 calculated from the detection value of the pad displacement sensors 31a and 31b or the rotor displacement sensor 31c.

After step S3A, an initial value of gradient amount is set to the value detected at step S20 (step S21), and steps S22 to 24 are sequentially performed from step S21 to step S7A (determination whether the centering operation should be performed) corresponding to step S7 in FIG. 2.

At step S22, a predetermined time period (interval), which indicates when the gradient amount change should be calculated, passes (corresponding to step S5 in FIG. 3). At step S23, a current thermal gradient amount of the disk rotor 1 which is returning to the normal state or recovering by heat release is calculated based on a detection signal of the pad displacement sensors 31a and 31b or the rotor displacement sensor 31c. At step S24, it is determined whether the gradient amount change is equal to or larger than the first threshold value.

At step S7A, it is determined whether the centering operation (step S8A corresponding to step S8 in FIG. 2), which is performed by actuating a solenoid 9A (see FIG. 4), is necessary, by determining whether the vehicle is running based on an output from the vehicle speed sensor 25.

If the result of the determination at step S24 is NO (the gradient amount change is less than the first threshold value), then it is determined whether the change of the gradient amount change is less than the second threshold value (step S25). If the result of the determination at step S25 is NO, then the flow returns to step S22. If the result of the determination at step S25 is YES, then the clearance adjusting control is ended.

In the second embodiment, if the result of the determination at step S7A is NO, then the flow returns to step S22. If the result of the determination at step S7A is YES, then flow advances to step S8A. At step S8A, the centering operation ["CENTERING" in FIG. 3(A)] is performed and a centering operation counter is incremented by one. Then, the flow returns to step S21.

In the second embodiment, when the gradient amount change is equal to or more than the first threshold value, and it is determined that the centering operation is necessary (the determination result at step S7A is YES), the centering operation (step S8A) is performed by actuating the solenoid 9. When the gradient amount change becomes less than the first threshold value, and the change of the gradient amount change becomes less than the second threshold value (this means that the disk rotor 1 has sufficiently recovered from the thermal gradient), the determination is made as YES at step S25, and then the clearance adjusting control is ended.

As mentioned above, an initial value of thermal gradient of the disk rotor 1 is determined [step S20], and it is determined whether the centering operation (the operation moving the brake pads into contact with the disk rotor 1, and then separating the pads from the disk rotor 1) should be performed, according to a change of deformation of the disk rotor 1 by heat release over time. More specifically, the centering operation is performed by actuating the solenoid 9, if a gradient amount change by an amount equal to or more than the first threshold value is continuously detected. Even if the gradient amount change is less than the first threshold value, as long as the change of the gradient amount change is equal to or more than the second threshold value, the centering operation is performed once the gradient amount change exceeding the first threshold value is detected after the predetermined interval has passed. (for example, steps S22, S24, S25 and S8A) When the gradient amount change becomes less than the first threshold value, and the change of the gradient amount change becomes less than the second threshold value (YES at step S25), the centering operation (clearance adjusting control) is ended.

By this control, it is possible to perform the clearance adjustment according to a change of thermal deformation of the disk rotor 1 over time. Since contact time of the brake pads 2 and 3 with the disk rotor 1 is reduced by performing the centering operation, it is possible to prevent generation of disk thickness variation (DTV) of the disk rotor 1, leading to prevention of judder occurrence.

In the second embodiment, the centering operation is ended when it is determined at step 25 that the change of the gradient amount change is less than the second threshold value. In other embodiments, the centering operation may be ended when it is determined at step 25 that the gradient amount change is less than the first threshold value for a predetermined time period (the result of the determination at step 24 is NO for the predetermined time period); in other words, at step 25, it may be determined whether a gradient change amount less than the first threshold value is continuously detected for a predetermined time period, and the centering operation may be ended if the result of the determination at this step S25 is YES.

It may be determined at step S7A whether the vehicle is stopped based on a shift position (P range), instead of using the vehicle speed sensor 25, and step S8A may be not performed if it is determined that the vehicle is stopped, although this is not shown in FIG. 5.

In the second embodiments, an initial value of the thermal gradient amount is calculated based on measurement of the pad displacement sensors 31a and 31b, or the rotor displacement sensor 31c. Instead of this, in some embodiments, an initial value of thermal gradient amount may be estimated using the temperature sensor 22. In other embodiments, a braking state may be determined using a detection value of the hydraulic pressure sensor 21, the stroke sensor 23, a resolver 50 shown in FIG. 11 (rotational position detector) which will be described later, or the vehicle speed sensor 25, and then an initial value of thermal gradient amount of the disk rotor 1 may be estimated based on an amount of heat generated by the braking; in these embodiments, a detection value of the vehicle weight sensor 27 may be also used to improve detection accuracy of an initial value of thermal gradient amount. The vehicle weight sensor 27 may be embodied by, for example, a height sensor for adjusting a headlight of the vehicle.

In the second embodiment, a current thermal gradient amount is estimated using the temperature sensor, or is measured using the rotor displacement sensor 31 (or the pad displacement sensors 31a and 31b). In other embodiments, a cooling state of the disk rotor 1 may be estimated using a detection value of the vehicle speed sensor 25, and then the current thermal gradient amount may be calculated based on a heat release amount; in these embodiments, a detection value of the atmospheric temperature sensor 26 may be also used to improve calculation accuracy of the current thermal gradient amount.

(Third Embodiment)

Figure 6:
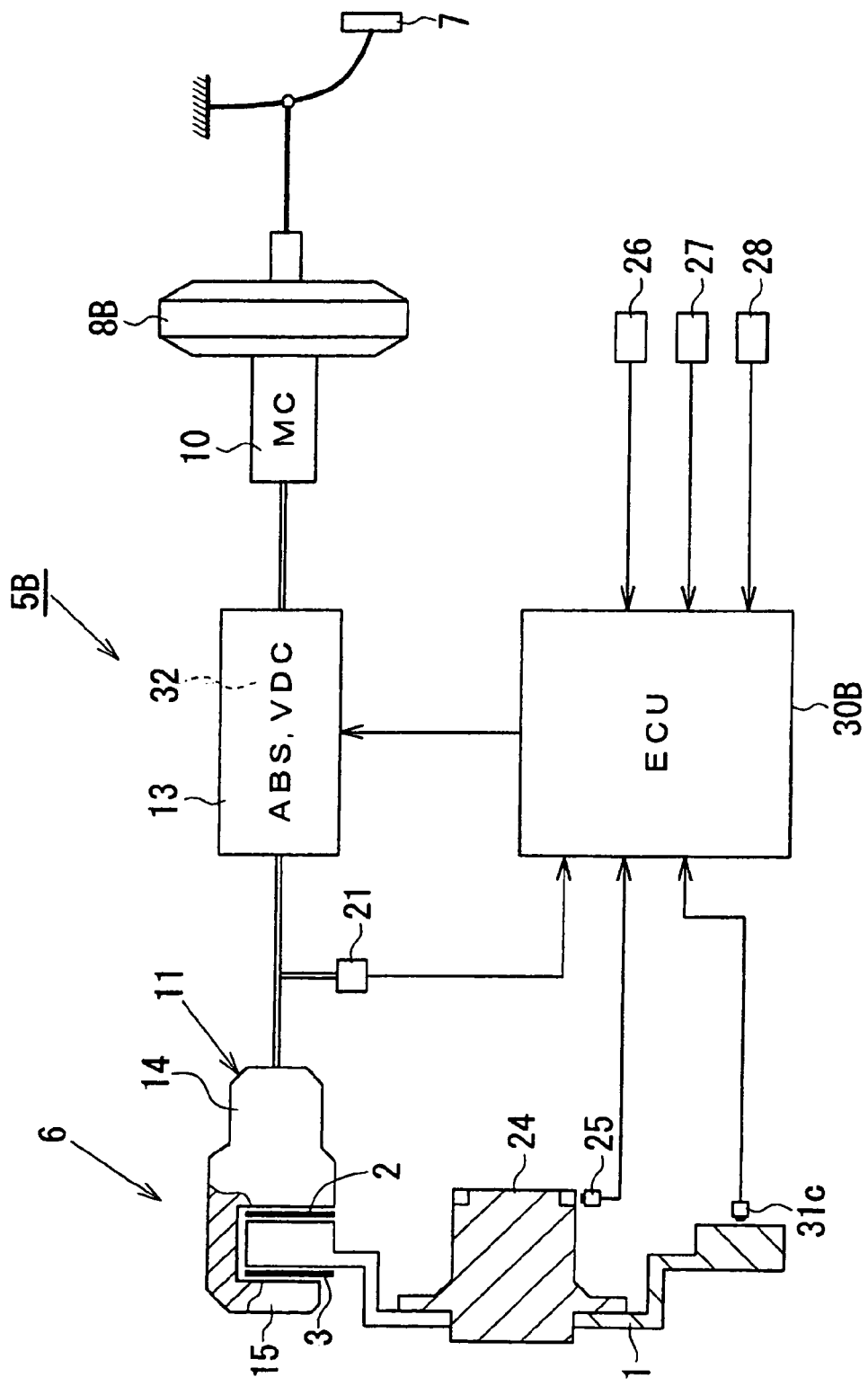
FIG. 6 schematically illustrates a disk brake apparatus of a third embodiment of the present invention.

Although in the first and second embodiments, the actuator is embodied by the ACC control booster 8 or 8A (more correctly, the solenoid 9 or 9A disposed at the ACC control booster 8 or 8A), the actuator may be embodied by other means. For example, as shown in FIG. 6, in a disk brake apparatus 5B (a third embodiment), an actuator may be embodied by a VDC pump 32 (hydraulic pump) disposed at a VDC (Vehicle Dynamics Control system) incorporated in an automatic brake system 13. The disk brake apparatus 5B of the third embodiment comprises a booster (boosting apparatus) 8B that does not execute the ACC control, instead of the ACC control boosters 8 and 8A. The third embodiment comprises a rotor displacement sensor 31c, similarly to the second embodiment, and a thermal gradient amount (displacement) of a disk rotor 1 is calculated using a detection signal of the sensor 31c to determine whether the centering operation (clearance adjusting control) should be performed.

In the third embodiment, the centering operation is performed by turning on/off the VDC pump 32, and a control similar to the clearance adjusting control of the second embodiment (FIG. 5) is performed. Therefore, an appropriate clearance can be generated as is the case in the second embodiment, so that so-called one-side wear is not caused even when a braking operation is reperformed, whereby it is possible to prevent generation of thickness variation of the disk rotor 1, and prevent judder occurrence.

In the third embodiment, the actuator is embodied by the VDC pump 32 (hydraulic pump). In embodiments in which a traction control system (TCS) is employed in a vehicle, the actuator may be embodied by a pump for traction control; in such embodiments, the centering operation is performed by instantaneously turning on/off the pump for traction control.

(Fourth Embodiment)

A disk brake apparatus 5C of a fourth embodiment of the present invention will be described with reference to FIG. 7.

In the fourth embodiment, the actuator is embodied by a hydraulic pump 34 disposed at a BBW actuator (Brake-by-wire actuator) 33. The hydraulic pump 34 is connected to a hydraulic pressure chamber 12 of a disk brake 6 through a brake liquid passage 35. In the fourth embodiment, components corresponding to the ACC control booster 8 and the MC 10 in the first embodiment are omitted.

In the fourth embodiment, the centering operation is performed by instantaneously turning on/off the hydraulic pump 34, and the effects similar to those in the before-mentioned embodiments can be brought about.

(Fifth Embodiment)

A disk brake apparatus 5D of a fifth embodiment of the present invention will be described with reference to FIG. 8.

Figure 8:
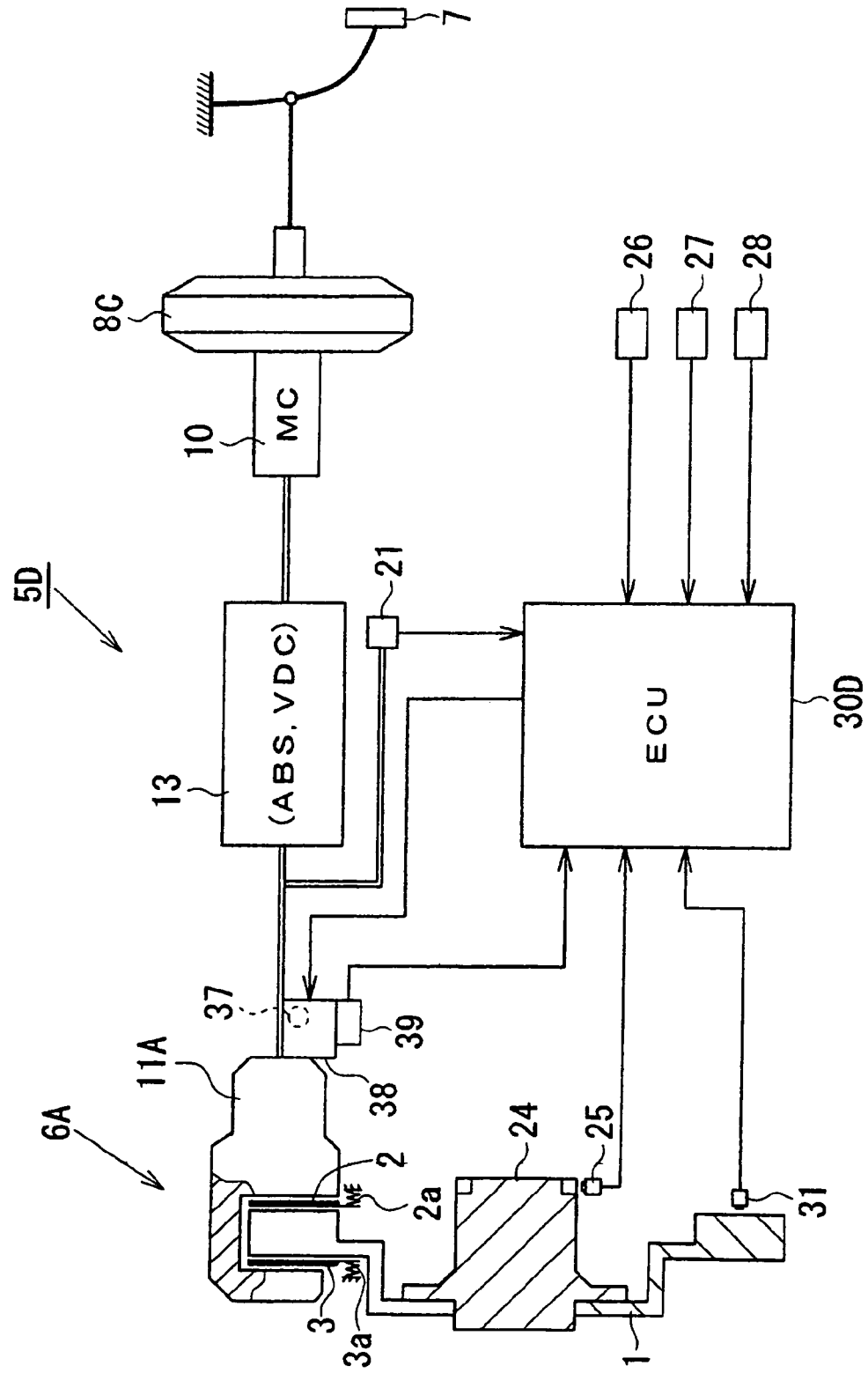
FIG. 8 schematically illustrates a disk brake apparatus of a fifth embodiment of the present invention.

As shown in FIG. 8, the disk brake apparatus 5D of the fifth embodiment is structurally and mechanically different from the disk brake apparatus of the first embodiment, mainly in terms of the following features.

(1) The disk brake 6 is replaced with a disk brake 6A capable of executing the PKB (parking brake) function by performing an electric operation (hereinafter referred to as EPB-operable disk brake).

(2) A caliper 11A capable of executing the PKB function (hereinafter referred to as PKB-built-in caliper) is used as a caliper of the EPB-operable disk brake 6A.

(3) A PKB driving apparatus 38 including an electric motor 37 is attached to the PKB-built-in caliper 11A, and the electric motor 37 is driven under a control by an ECU 30D to be used as the actuator.

(4) A stroke detector 39 (or driving force detector) is disposed at the PKB driving apparatus 38.

(5) The ACC control booster 8 in the first embodiment is replaced with a booster (boosting apparatus) 8C that does not perform the ACC control.

In the fifth embodiment, the centering operation is performed by instantaneously performing a forward/reverse control on the electric motor 37, and the effects similar to those in the before-mentioned embodiments can be brought about.

(Sixth Embodiment)

A disk brake apparatus 5E of a sixth embodiment of the present invention will be described with reference to FIG. 9.

Figure 9:
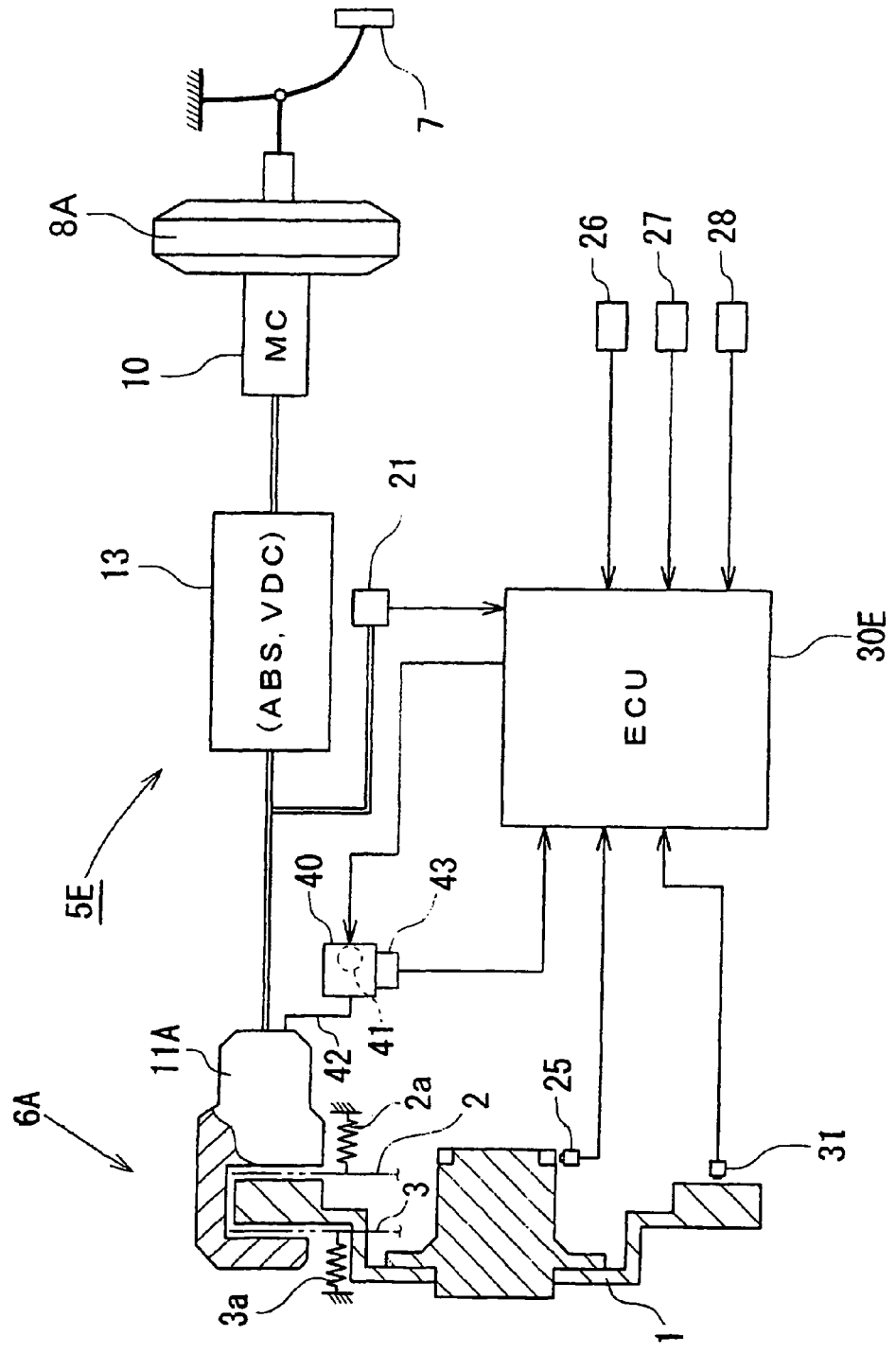
FIG. 9 schematically illustrates a disk brake apparatus of a sixth embodiment of the present invention.

As shown in FIG. 9, the disk brake apparatus 5E of the sixth embodiment is structurally and mechanically different from the disk brake apparatus 5D of the fifth embodiment (FIG. 8), mainly in terms of the following features.

(1) Instead of the PKB driving apparatus 38, a PKB cable driving apparatus 40 is attached to a PKB-built-in caliper 11A.

(2) An electric motor 41 disposed at the PKB cable driving apparatus 40 operates a PKB cable 42 to actuate a moving portion (not shown) of the PKB-built-in caliper 11A connected to the PKB cable 42, and therefore actuate brake pads 2 and 3, so that the electric motor 41 serves as the actuator.

(3) The stroke detector 39 in the fifth embodiment is replaced with a tensional force detector 43 (or stroke detector).

In the sixth embodiment, the centering operation is performed by instantaneously performing a forward/reverse control on the electric motor 41, and the effects similar to those in the before-mentioned embodiments can be brought about.

(Seventh Embodiment)

A disk brake apparatus 5F of a seventh embodiment of the present invention will be described referring to FIG. 10, and also sometimes referring to FIG. 7 as necessary.

Figure 7:
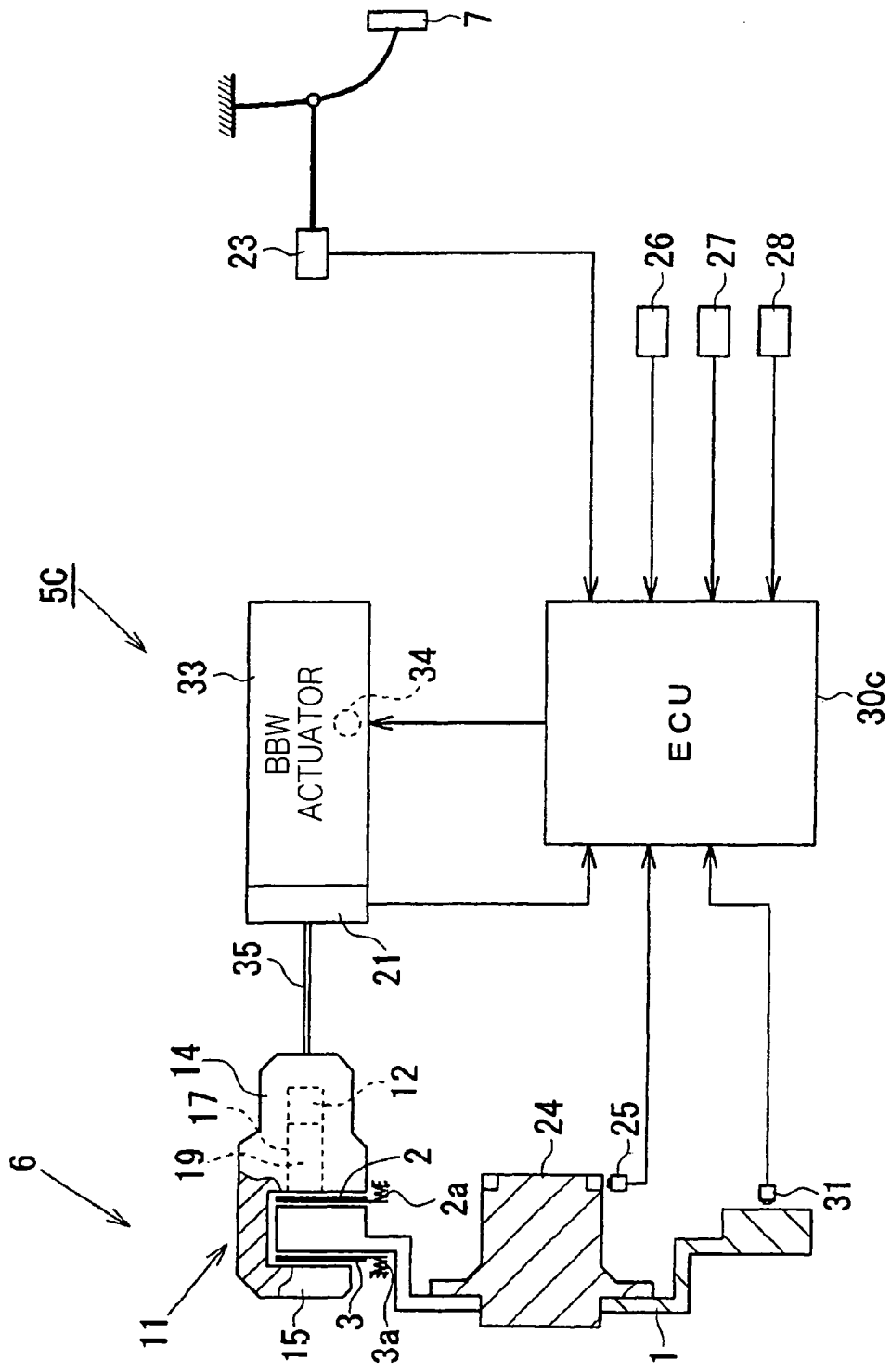
FIG. 7 schematically illustrates a disk brake apparatus of a fourth embodiment of the present invention.
Figure 10:
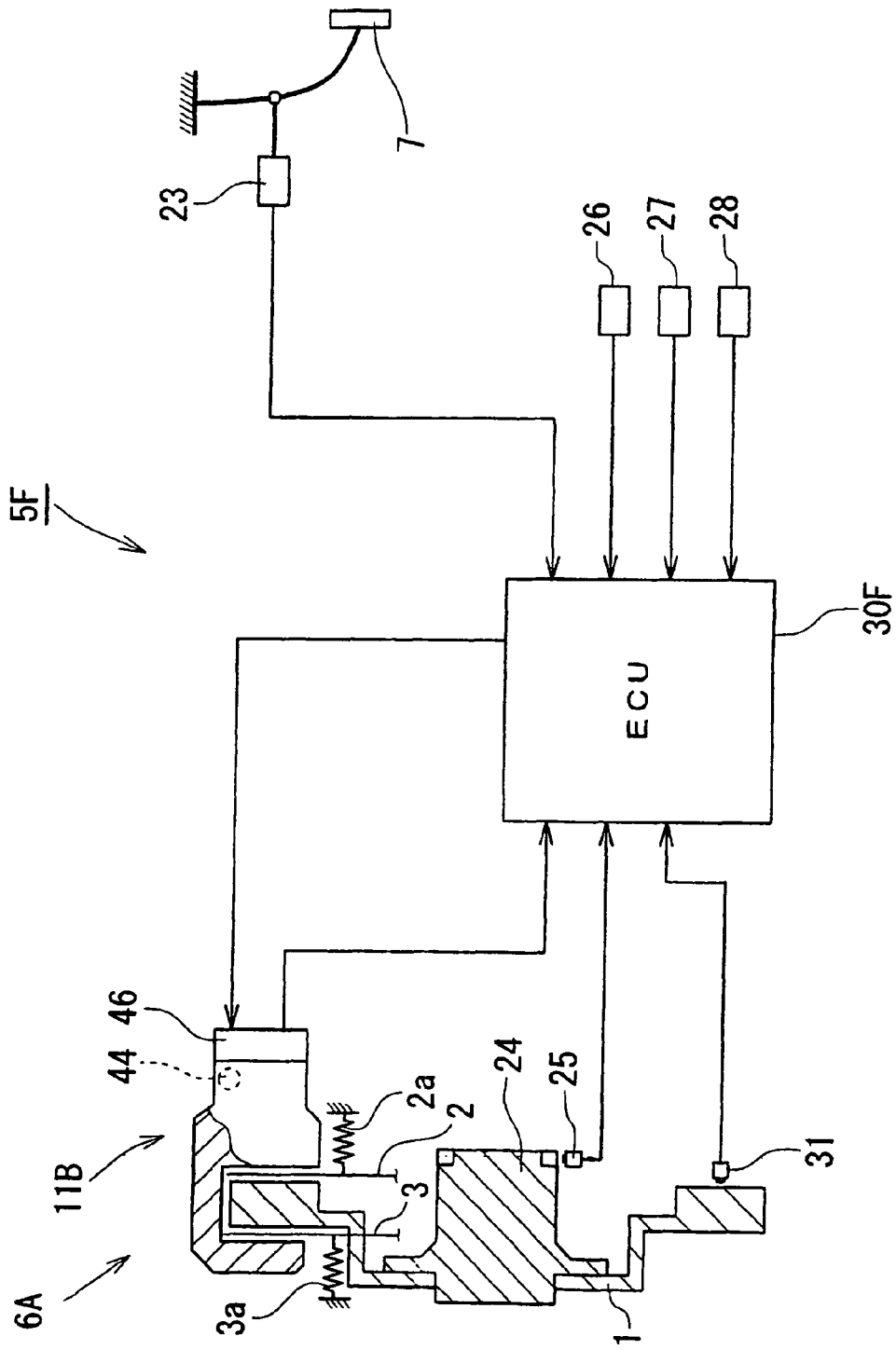
FIG. 10 schematically illustrates a disk brake apparatus of a seventh embodiment of the present invention.

As shown in FIGS. 7 and 10, the disk brake apparatus 5F of the seventh embodiment is structurally and mechanically different from the disk brake apparatus 5C of the fourth embodiment (FIG. 7), mainly in terms of the following features.

(1) The caliper 11 of the disk brake 6 is replaced with an electric caliper 11B including an electric motor 44, and adapted to press brake pads 2 and 3 against the disk rotor 1 by being driven by the electric motor 44.

(2) A stroke detector 46 adapted to detect a stroke of a brake pad actuating member (not shown) for actuating the brake pads 2 and 3 by being driven by the electric motor 44 is disposed.

(3) The BBW actuator 33 is omitted.

In the seventh embodiment, the centering operation is performed by instantaneously performing a forward/reverse control on the electric motor 44, and as is the case in the fourth embodiment, a clearance adjusting control corresponding to the clearance adjusting control in the first embodiment (FIG. 2) or the second embodiment (FIG. 5) is performed. By this control, an appropriate clearance can be generated as is the case in the first or second embodiment, so that so-called one-side wear is not caused even when a braking operation is reperformed, whereby it is possible to prevent generation of thickness variation of the disk rotor 1, and prevent judder occurrence.

(Eighth Embodiment)

Figure 11:
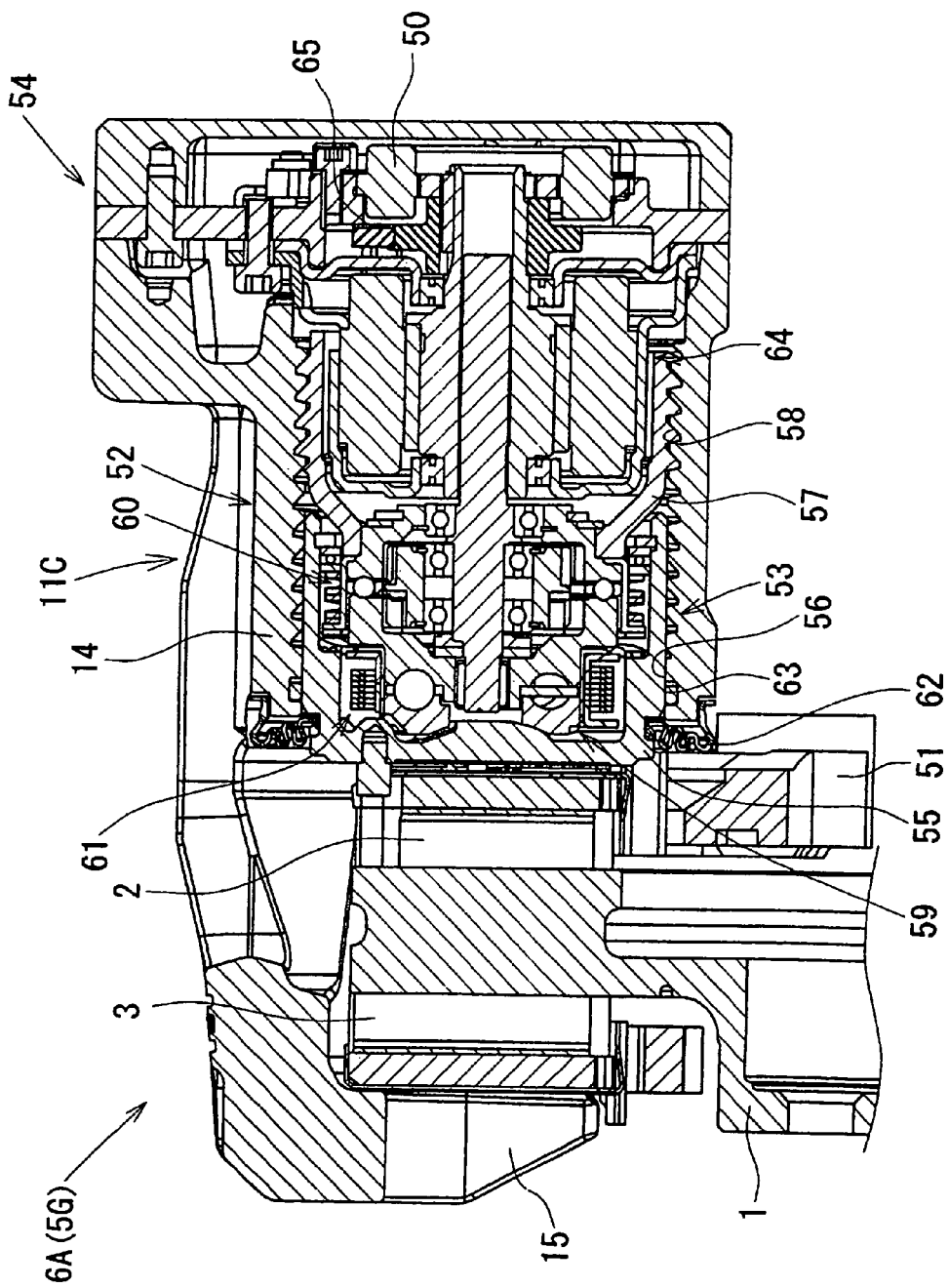
FIG. 11 a cross-sectional view illustrating a disk brake of a disk brake apparatus of an eighth embodiment of the present invention.

The disk brake comprising the electric caliper 11B in the seventh embodiment (FIG. 10) may be replaced with, for example, a disk brake 6A shown in FIG. 11. In the disk brake 6A (eighth embodiment), the displacement sensor of the rotor (thermal deformation measuring unit) is embodied by a resolver 50, as will be described later.

In the eighth embodiment, the effects similar to those in the before-mentioned embodiments can be brought about.

A general description will be provided as to a structure of the disk brake 6A shown in FIG. 11. Referring to FIG. 11, the disk brake 6A comprises a disk rotor 1, carrier 51, a pair of brake pads (inner pad 2 and outer pad 3), and an electric caliper 11C disposed so as to extend over the disk rotor 1, and supported so as to be movable along an axial direction of the disk rotor 1 relative to the carrier 51 by a pair of slid pins (not shown).

The electric caliper 11C comprises a caliper main body 52, a pad pressing member unit 53, and a motor unit 54. The caliper main body 52 comprises a cylindrical cylinder portion 14 including a through-hole open to one side of the disk rotor 1, and a claw portion 15 straddling the disk rotor 1 so as to extend from the cylinder portion 14 to the opposite side. The cylinder portion 14 and the claw portion 15 are integrally provided. The cylinder portion 14 has an inner surface where a guide bore 56 and a female screw 58 are formed. A pad pressing member 55 of the pad pressing member unit 53 is slidably fitted in the guide bore 56. A male screw of an adjusting screw 57 attached to the pad pressing member unit 53 is screwed into the female screw 58.

The pad pressing member unit 53 is formed by integrally assembling the bottomed cylindrical pad pressing member 55, a ball ramp mechanism 59 (rotation-linear motion converting mechanism) and a differential speed reducing mechanism 60 which are contained in the pad pressing member 55, and a pad wear compensating mechanism 61. The pad pressing member 55 is slidably fitted in the guide bore 56 of the caliper main body 52, and abuts against the inner pad 2. The pad pressing member 55 is restrained from rotating by a pin (not shown and not labeled). A dust seal 62 and a seal ring 63 seal between the pad pressing member 55 and the guide bore 56.

The motor unit 54 is formed by integrally assembling an electric motor 64, the resolver 50 (rotational position detector) operable to detect a rotational position of the electric motor 64, and a lock mechanism 65 operable to maintain a rotational position of the electric motor 64. In the eighth embodiment, the resolver 50 is used for detecting a rotational position of the electric motor 64. In other embodiments, the resolver 50 may be replaced with an optical or magnetic rotary encoder.

The resolver 50 can be used as a displacement sensor of the rotor (thermal deformation measuring unit) for the following reason; when the disk rotor 1 is returning to the normal state or recovering from thermal gradient by heat release, the tilting disk rotor 1 abuts against the brake pad 2 to which the centering operation is performed, because a control for expanding a pad clearance is not performed in any embodiments of the present invention, unlike the before-mentioned invention of patent document 1. This abutment displaces the brake pad 2, and this displacement is measured by the resolver 50 (displacement measuring unit, rotational position detector). Based on this measuring result, it is possible to estimate deformation of the disk rotor 1 by heat release. In addition, a braking state may be determined and a braking force may be estimated based on a detection value of the resolver as to a rotational position of the motor, and the thermal gradient amount may be estimated based on an amount of heat generated by the braking, by using a detection value of the vehicle speed sensor as well as the determined braking state and the estimated braking force. In this way, the thermal deformation estimating unit can be embodied by the resolver 50 and the ECU 30F.

(Ninth and Tenth Embodiments)

Figure 12:
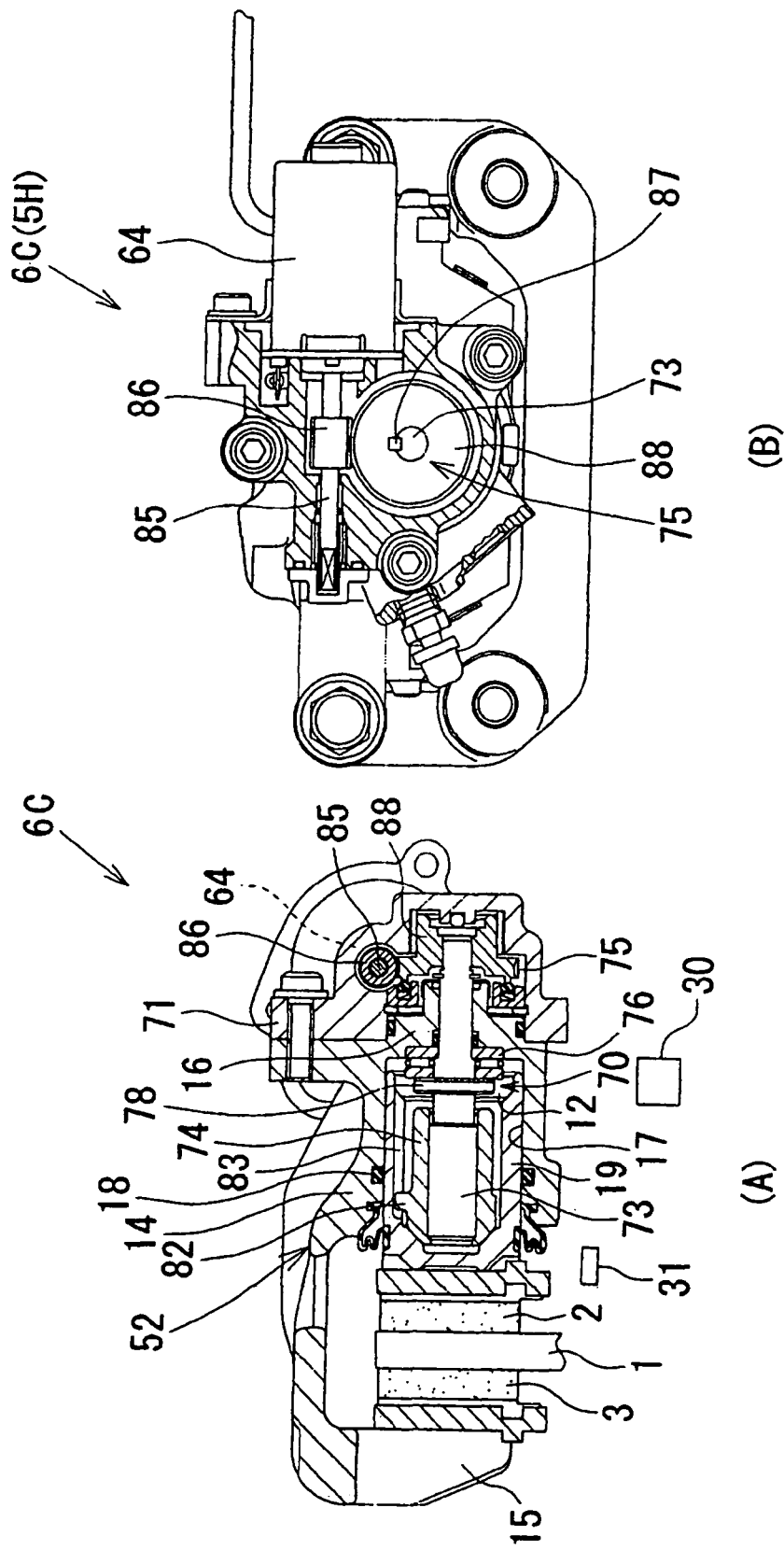
FIG. 12(A) is a cross-sectional view illustrating a disk brake of a disk brake apparatus of a ninth embodiment of the present invention.
FIG. 12(B) is a front elevation partly in section illustrating the disk brake of the disk brake apparatus of the ninth embodiment of the present invention.
Figure 13:
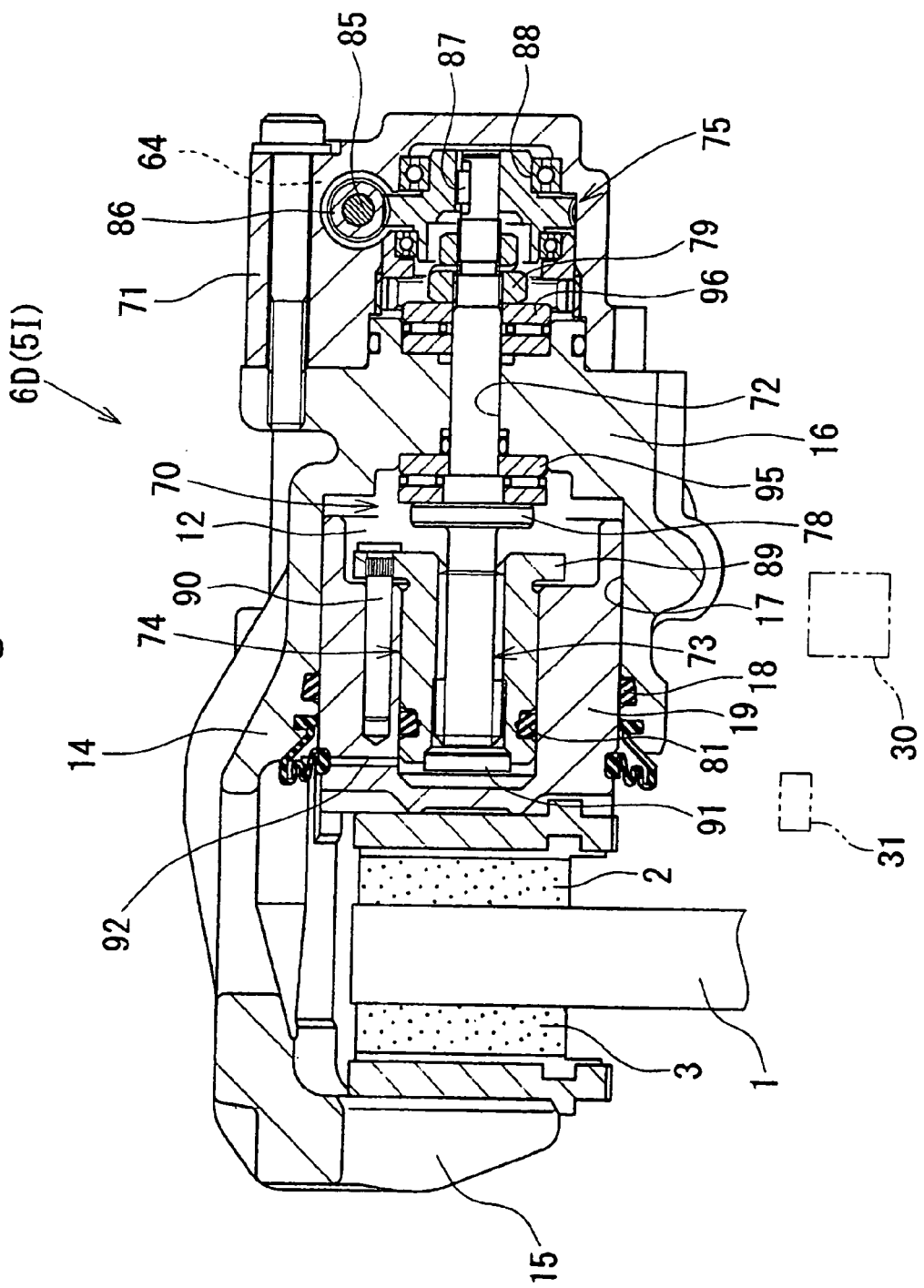
FIG. 13 a cross-sectional view illustrating a disk brake of a disk brake apparatus of a tenth embodiment of the present invention.

In the fifth, sixth and seventh embodiments, the disk brake 6A capable of executing the parking brake function is employed. However, other disk brakes may be used in other embodiments. For example, a disk brake apparatus 5H (a ninth embodiment) comprises a hydraulic-press-type disk brake 6C having the electrically-driven parking brake function [HPB, hereinafter referred to as "first HPB caliper" for the sake of simplicity], as shown in FIGS. 12(A) and 12(B). A disk brake apparatus 5I (tenth embodiment) comprises a disk brake 6D [HPB, hereinafter referred to as "second HPB caliper" for the sake of simplicity], as shown in FIG. 13.

Referring to FIGS. 12(A) and 12(B) [the ninth embodiment], a hydraulic pressure is supplied from a master cylinder (not shown) to a hydraulic pressure chamber 12 of the first HPB caliper 6C. A housing 71 is supported outside a cylinder bottom wall 16. A parking brake mechanism 70 is disposed in the housing 71 and a cylinder portion 14 so as to extend through the cylinder bottom wall 16. The parking brake mechanism 70 has one end side extending from the inside of a cylinder 17 to the inside of the housing 71 through a through-hole formed through the cylinder bottom wall 16. The parking brake mechanism 70 generally comprises a shaft 73 having a male screw on the other end side positioned in a cup portion of a piston 19, a nut 74 disposed in the cup portion of the piston 19 and having on an inner surface thereof a female screw engaged with the male screw of the shaft 73, and a gear mechanism 75 disposed in the housing 71 and adapted to cause a rotation of the shaft 73 by being driven by an electric motor 64.

The shaft 73 is disposed along an axis line of the cylinder 17, and is rotatably supported at an intermediate portion thereof by a bearing 76. The shaft 73 comprises a flange portion 78 formed at the intermediate portion thereof and configured to abut against the bearing 76 disposed in the cylinder 17.

The nut 74 comprises a convex portion 82 formed on an outer surface thereof, and is restrained from rotating by the convex portion 82 inserted in a groove 83 formed on an inner surface portion of the piston 19.

The gear mechanism 75 for rotating the shaft 73 comprises a worm 86 fixed to a rotational axis of the electric motor 64, and a worm wheel 88 attached non-rotatably to the one end side of the shaft 73 via a key 87 and meshed with the worm 86. The worm wheel 88 is rotatably supported by the housing 71 through a bearing (not labeled).

In the ninth embodiment, when a normal braking operation is performed, the electric motor 64 is stopped and a hydraulic pressure is supplied from the master cylinder to the hydraulic pressure chamber 12 in response to an operation of a brake pedal 7. Since the electric motor 64 is stopped and therefore a movement of the nut 74 is not caused, only the piston 19 advances to press an inner pad 2 against a disk rotor 1, the reactive force of which causes a caliper main body 52 to move toward an inner side of the vehicle, and then a claw portion 15 of the caliper main body 52 presses an outer pad 3 against the disk rotor 1. In this way, the disk rotor 1 is sandwiched between the inner and outer pads 2 and 3, whereby a braking force is generated according to the applied hydraulic pressure. When the hydraulic pressure in the hydraulic pressure chamber 12 is released, the elastic resilient force of a piston seal 18 causes the piston 19 to retract, thereby moving the inner and outer pads 2 and 3 away from the disk rotor 1 to release the braking force.

When the parking brake function is executed, the disk brake 6C works as follows. In response to an operation of a parking brake switch (not shown), an ECU 30 outputs a control signal so that a control signal is outputted to a hydraulic pressure unit (not shown), and thereby a hydraulic pressure is supplied to the hydraulic pressure chamber 12 to exert a braking force in the same manner as a normal braking operation is preformed. On the other hand, substantially simultaneously with supply of the hydraulic pressure to the hydraulic pressure chamber 12, the electric motor 64 is actuated by an instruction from the ECU 30D, 30E or 30F. The actuation of the electric motor 64 causes a rotation of the shaft 73, and therefore causes a linear movement (forward movement) of the nut 74 to press the piston 19 in an advancing direction. After that, substantially simultaneously with stop of the electric motor 64, a circuit in the hydraulic pressure unit is switched by an instruction from the ECU 30D, 30E or 30F to release the hydraulic pressure from the hydraulic pressure chamber 12. At this time, since a large frictional force is generated at the engaging portion of the nut 74 with the piston 17 by an axial force from the piston 19, and the gear mechanism 75 is irreversible, the shaft 73 is restrained from rotating and the nut 74 is maintained in this position. That is, even when the electric motor 64 is stopped and the hydraulic pressure is released, the piston 17 is mechanically maintained in the braking position, and thereby parking braking is realized.

In the ninth embodiment, the clearance adjusting control similar to that in the second embodiment (FIG. 5) is performed. The centering operation is performed by instantaneously turning on/off the hydraulic pressure unit. Similarly to the second embodiment, the clearance adjustment can be performed according to a change of deformation of the disk rotor 1 by heat release over time. In addition, the contact time of the brake pads 2 and 3 with the disk rotor 1 is reduced by performing the centering operation, whereby it is possible to prevent generation of thickness variation of the disk rotor 1 (DTV) and to prevent judder occurrence.

The second HPB caliper 6D of the tenth embodiment is structurally and mechanically different from the first HPB caliper 6C of the ninth embodiment, mainly in terms of the following features (1) to (6). In the tenth embodiment, the effects similar to those in the before-mentioned embodiments can be brought about, similarly to the ninth embodiment.

(1) The nut 74 comprises a pin 90 axially erected from a flange portion 89 formed at a back end of the nut 74. The nut 74 is restrained from rotating by the pin 90 slidably inserted in an axially-extending pin hole (not labeled) formed at a piston 19.

(2) A cover plate 91 is attached to a tip opening of the nut 74, and an air-bleeding hole 92 is radially formed through the piston 19 for discharging air between an inner bottom of the piston 19 and the tip of the nut 74 including the cover plate 91.

(3) A rotation of the shaft 73 causes a linear movement of the nut 74, which in turn applies a force to press the piston 19 in an advancing direction by abutting against a rear end of the piston 19 at the flange portion 89 of the nut 74.

(4) The nut 74 engaged with the shaft 73 is slidably fitted in the piston 19 via a seal member 81.

(5) The shaft 73 is disposed along an axial line of the cylinder 17, and is rotatably supported at an intermediate portion thereof by two bearings (thrust bearings) 95 and 96 disposed on the respective sides of a cylinder bottom wall 16.

(6) The shaft 73 comprises a flange portion 78 formed at the intermediate portion thereof. The flange portion 78 is configured to abut against the bearing 95 or the bearing disposed in the cylinder 7. The shaft 73 has one end side extending into the housing 71, where a screw portion configured to receive a double nut 79 is formed. The shaft 73 is axially securely restrained to the two bearings 95 and 96 by tightening the double nut 79 into the screw portion.

In the tenth embodiment, the clearance adjusting control similar to that in the second embodiment (FIG. 5) is performed. The centering operation is performed by instantaneously turning on/off the hydraulic pressure unit. Similarly to the second embodiment, the clearance adjustment can be performed according to a change of deformation of the disk rotor 1 by heat release over time. In addition, the contact time of brake pads 2 and 3 with a disk rotor 1 is reduced by performing the centering operation, whereby it is possible to prevent generation of disk thickness variation (DTV) of the disk rotor 1 and to prevent judder occurrence.

According to the before-described embodiments, in order to adjust the pad clearance according to a change of deformation of the disk rotor by heat release over time, the brake pads are moved into contact with the disk rotor and then are separated from the disk rotor by driving the actuator, after a braking force is generated. By this control, it is possible to adjust the pad clearance according to a change of deformation of the disk rotor by heat release over time, whereby the contact time of the brake pads with the disk rotor is reduced. Therefore, it becomes possible to prevent generation of thickness variation of the disk rotor, and prevent judder occurrence.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-227177, filed on Aug. 31, 2007. The entire disclosure of Japanese Patent Application No. 2007-227177 including specification, claims, drawings and summary is incorporated herein by reference in its entirety.

What is claimed is:

1. A disk brake apparatus comprising:
    an actuator;
    a brake pad that can be moved by actuating the actuator so that the brake pad is pressed against a disk rotor to generate a braking force; and
    a controller adapted to perform repeatedly a contact and separation control, which is a control for driving the actuator to cause the brake pad to be moved into contact with the disk rotor and then be separated from the disk rotor, when a change of deformation of the disk rotor by heat release over time occurs, so that a pad clearance is adjusted according to the change of deformation of the disk rotor by heat release over time after the braking force is generated, wherein:

before or until deformation of the disk rotor by heat release is finished after one braking operation is performed, the controller controls the actuator at a predetermined time interval to cause the brake pad to be moved into contact with the disk rotor, and the predetermined time interval is set to a larger value with each performance of the operation of moving the brake pad into contact with the disk rotor and separating the brake pad from the disk rotor.

2. The disk brake apparatus according to claim 1, wherein the disk brake apparatus comprises a thermal deformation measuring unit operable to measure deformation of the disk rotor by heat release, and the controller actuates the actuator when the thermal deformation of the disk rotor is detected by the thermal deformation measuring unit.

3. The disk brake apparatus according to claim 1, wherein the disk brake apparatus comprises a thermal deformation estimating unit operable to estimate deformation of the disk rotor by heat release based on a braking state, and the controller actuates the actuator when the thermal deformation of the disk rotor is estimated by the thermal deformation estimating unit.

4. The disk brake apparatus according to claim 3, wherein the thermal deformation estimating unit estimates the deformation of the disk rotor based on a measuring result of a temperature measuring unit operable to measure a temperature of the disk rotor.

5. The disk brake apparatus according to claim 4, wherein the thermal deformation estimating unit estimates the deformation of the disk rotor when the measuring result of the temperature measuring unit indicates a predetermined temperature decrease of the disk rotor.

6. The disk brake apparatus according to claim 1, wherein the actuator comprises an electric motor, and a piston disposed in a cylinder portion of a caliper adapted to press the brake pad is caused to slide by actuation of the electric motor so that the brake pad is moved, and the caliper is a floating caliper that includes the cylinder portion at one side thereof and is supported so as to be movable along the axial direction of the disk rotor.

7. The disk brake apparatus according to claim 6, wherein the electric motor is disposed in the caliper or is attached to the caliper, and the piston is caused to slide by a rotation-linear motion converting mechanism for converting the rotation of the electric motor to a linear motion so that the brake pad is moved.

8. The disk brake apparatus according to claim 6, wherein the electric motor is a motor disposed in a booster connected to a master cylinder which generates a hydraulic pressure to be supplied to the caliper.

9. The disk brake apparatus according to claim 2, wherein the actuator comprises an electric motor disposed in a caliper adapted to press the brake pad, and a piston disposed in a cylinder portion of the caliper adapted to press the brake pad is caused to slide by a rotation-linear motion converting mechanism for converting the rotation of the electric motor to a linear motion so that the brake pad is moved, and the thermal deformation measuring unit comprises a rotational position detector operable to measure a rotational position of the electric motor.

10. A disk brake apparatus comprising:
an actuator;
a brake pad that can be moved for braking by actuating the actuator so that the brake pad is pressed against a disk rotor to generate a braking force; and
a controller adapted to perform repeatedly a centering operation at a predetermined time interval, which is an operation for driving the actuator to cause the brake pad to be moved into contact with the disk rotor and then be separated from the disk rotor, so that a pad clearance is adjusted according to a change of thermal deformation of the disk rotor by heat release over time after the braking force is generated, in a period from a release of a brake operation after the thermal deformation of the disk rotor occurs due to the brake operation until an end of the thermal deformation as a result of heat release in the disk rotor.

11. The disk brake apparatus according to claim 10, wherein the actuator comprises a negative pressure booster including a solenoid, and a piston disposed in a caliper adapted to press the brake pad is caused to slide by actuation of the negative pressure booster via a master cylinder adapted to generate a hydraulic pressure to be supplied to the caliper so that the brake pad is moved.

12. The disk brake apparatus according to claim 10, wherein the actuator comprises a hydraulic pump, and a piston disposed in a cylinder portion of a caliper adapted to press the brake pad is caused to slide by actuation of the hydraulic pump so that the brake pad is moved.

13. The disk brake apparatus according to claim 12, wherein the hydraulic pump is a pump for a fraction control.

14. The disk brake apparatus according to claim 12, wherein the hydraulic pump is a pump of a hydraulic booster connected to a master cylinder which generates a hydraulic pressure to be supplied to the caliper.

15. The disk brake apparatus according to claim 10, the predetermined time interval is set to a larger value with each performance of the operation of the centering operation of the brake pad relative to the disk rotor.

16. The disk brake apparatus according to claim 10, wherein:
the disk brake apparatus comprises a thermal deformation measuring unit operable to measure deformation of the disk rotor by heat; and
the controller performs the centering operation when the thermal deformation of the disk rotor is detected by the thermal deformation measuring unit.

17. The disk brake apparatus according to claim 10, wherein:
the disk brake apparatus comprises a thermal deformation estimating unit operable to estimate deformation of the disk rotor by heat based on a braking state; and
the thermal deformation estimating unit estimates the deformation of the disk rotor based on a measuring result of a temperature measuring unit operable to measure a temperature of the disk rotor, and the controller performs the centering operation when the thermal deformation of the disk rotor is estimated by the thermal deformation estimating unit.

18. The disk brake apparatus according to claim 17, wherein the thermal deformation estimating unit estimates the deformation of the disk rotor when the measuring result of the temperature measuring unit indicates a predetermined temperature decrease of the disk rotor.

19. The disk brake apparatus according to claim 10, wherein:
- the actuator comprises an electric motor disposed in a caliper adapted to press the brake pad, and a piston disposed in a cylinder portion of the caliper adapted to press the brake pad is caused to slide by operation of a rotation-linear motion converting mechanism for converting the rotation of the electric motor to a linear motion so that the brake pad is moved; and
- the caliper is a floating caliper that includes the cylinder portion at one side thereof and is supported so as to be movable along the axial direction of the disk rotor.

20. The disk brake apparatus according to claim 16, wherein the actuator comprises an electric motor disposed in a caliper adapted to press the brake pad, and a piston disposed in a cylinder portion of the caliper adapted to press the brake pad is caused to slide by operation of a rotation-linear motion converting mechanism for converting the rotation of the electric motor to a linear motion so that the brake pad is moved, and the thermal deformation measuring unit comprises a rotational position detector operable to measure a rotational position of the electric motor.

\* \* \* \* \*